INVENTOR:
Louis Paul Druehl
BY
Eberhard E. Wetley
Atty.

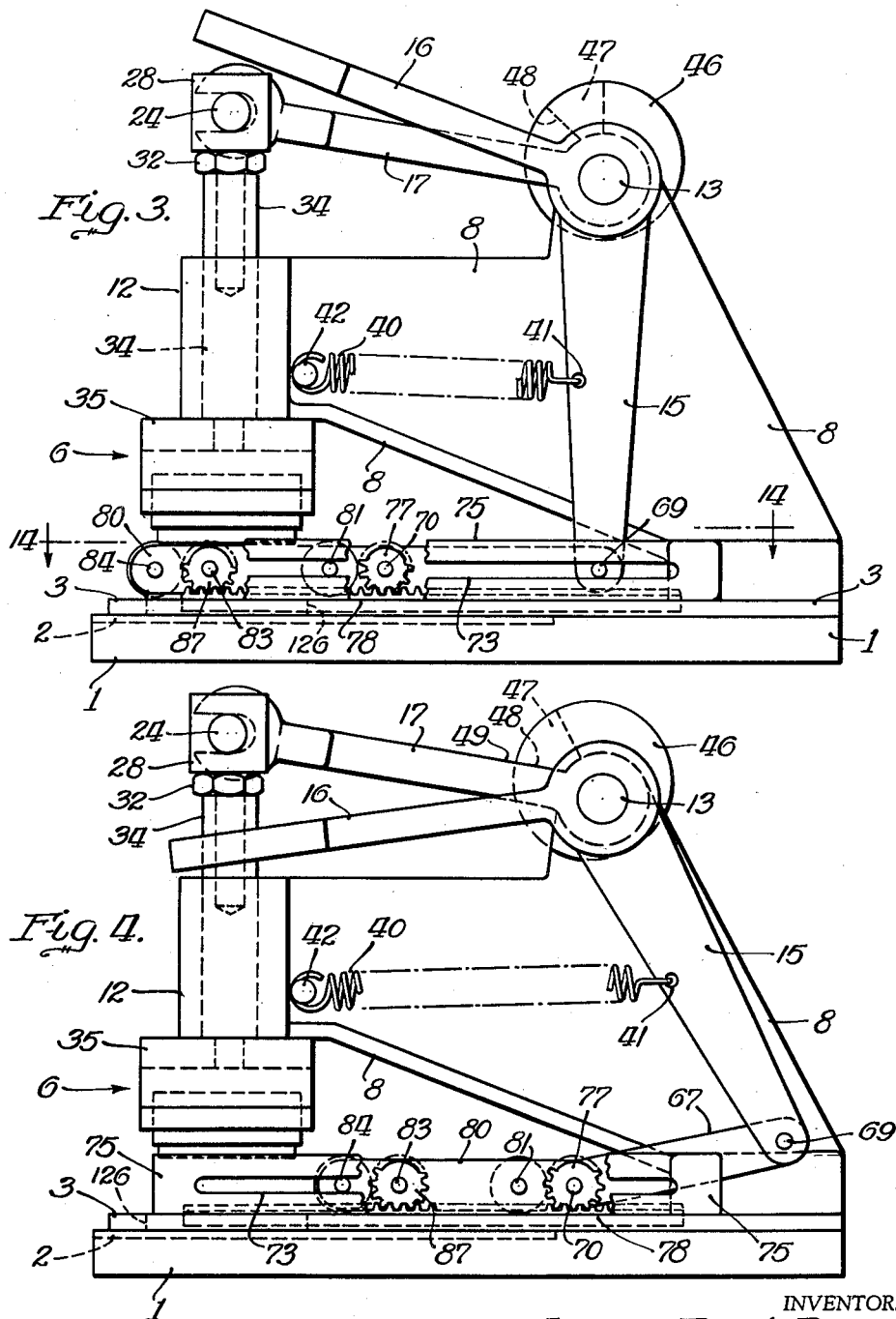

INVENTOR:
Louis Paul Druehl
BY
Eberhard E. Wetty
Atty.

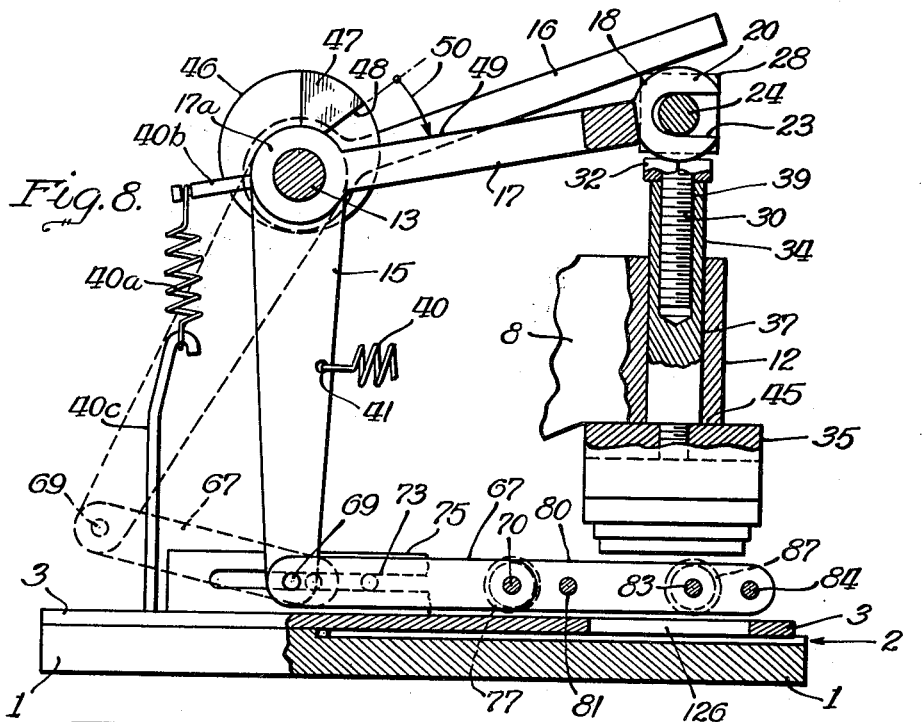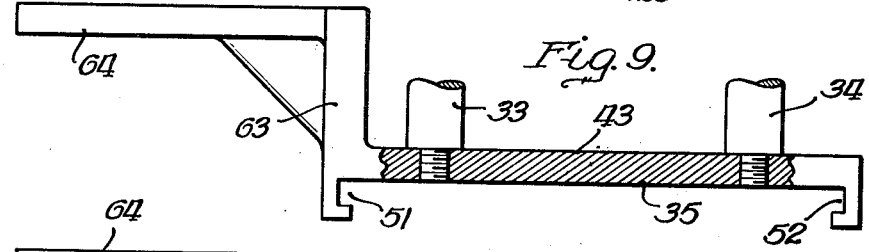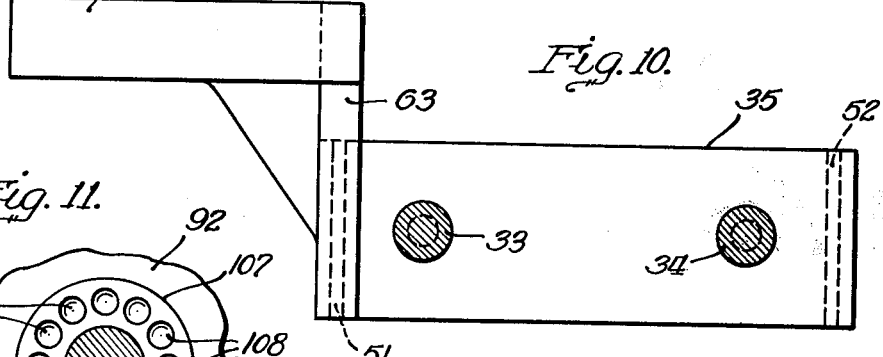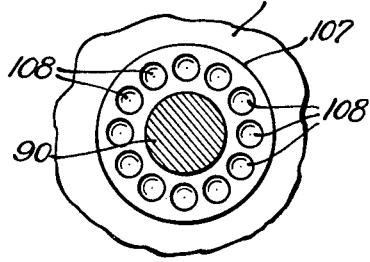

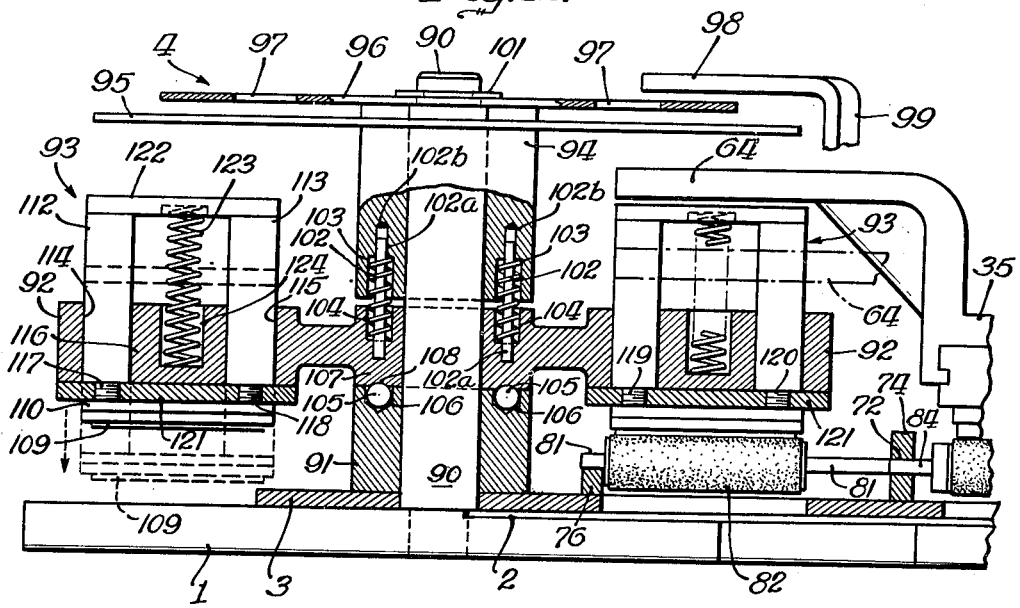
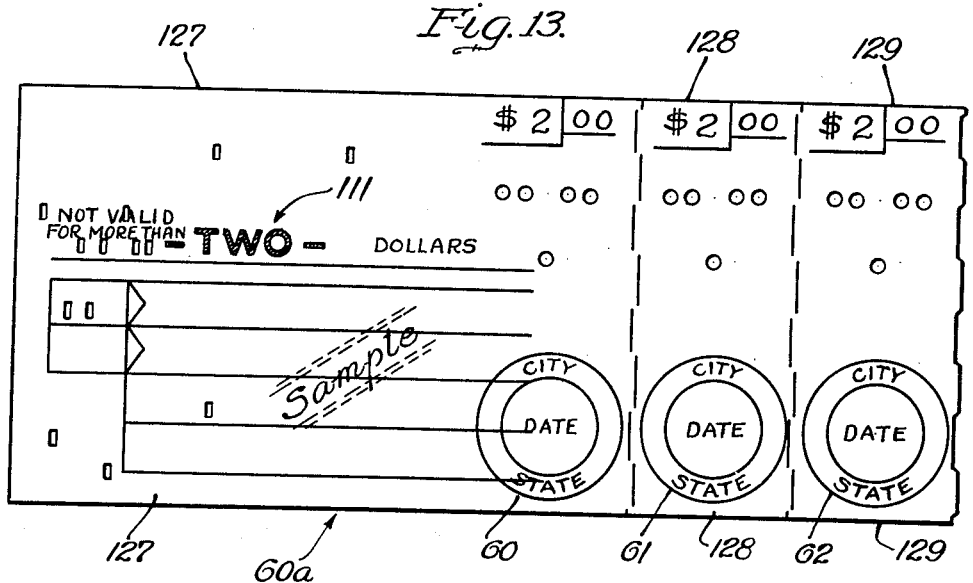

July 20, 1965  L. P. DRUEHL  3,195,454
AMOUNT CONTROL AND DATE AND PLACE STAMPING MACHINE
FOR U.S. PRINT-PUNCHED MONEY ORDERS
Filed April 29, 1963  7 Sheets-Sheet 7

INVENTOR:
Louis Paul Druehl
BY
Eberhard E. Wetter
Atty.

3,195,454
AMOUNT CONTROL AND DATE AND PLACE STAMPING MACHINE FOR U.S. PRINT-PUNCHED MONEY ORDERS
Louis Paul Druehl, 736 S. Euclid Ave., Oak Park, Ill.
Filed Apr. 29, 1963, Ser. No. 276,430
17 Claims. (Cl. 101—93)

This invention relates to a money order stamping machine to simplify the preparation and process of making or issuing a money order by grouping certain multiple final stamping operations into one concerted operation for the person issuing such money order accompanied by both simplicity of operation and by time saving in performing such services.

More specifically this invention is directed to a machine of new and novel construction devised for the acceptance of a money order in one oriented position for the purpose of simultaneously stamping or imprinting the money order with the maximum limit denomination as a money stamp imprint and with a triple stamp or imprint of the date, city and state as is customary and required on U.S. Postal Money Orders that are used with the print-punched cards constituting such money orders.

It has been observed that too many independent and unnecessary operations are performed in the process of completing a money order particularly after such card type money orders are removed from print-punch machines that serve part of the process of issuing money orders. Further, since hand stamping operations were required, it was further observed that in some cases the finished or completed money order was imperfect, poorly inked, partially imprinted, and sometimes even illegible.

An object of this money order stamping machine of the present invention is to group perform a number of the final or completing operations of making a money order with corresponding results that provide perfectly inked or stamped money orders with clearly legible inked impressions.

Another object is to provide a simple easily operated money limit indexing dial stamp arrangement for the only setting needed to fully stamp a money order prior to the single manual handle depression to imprint the money limit and triplicate date stamps that appear on the money order proper and on the two attached stubs of such money order.

A still further object is to provide a carriage assembly as a translatory inking roller mechanism disposed for operation beneath the rubber stamp group to keep the stamps inked and to maintain the stamps in good inked condition. These inking rollers occupy positions in the normal path of stamp actuation toward the money order, but they are readily retractable out of the path of the stamps prior to the stamping cycle of the machine.

Another object is to introduce an actuation mechanism of single handle action to carry out the inking and stamping cycles of the machine in timed sequence and which mechanism includes a simple lost motion arrangement to carry out the respective operations in their selected order of performance.

Another object is to provide independent money limit stamping means and the stamp means for the date and place of issuance and to include a linking means between such means rendered operable by the single handle actuated mechanism that serves the machine to stamp a selected money order.

A still further object is a novel arrangement of money order orientation means devised to align the money order card in relation to the several sets of inked stamps, which orientation means protects the money order from the rollers and roller ink area by means of a shielding cover overlying a money order card holding recess in the machine base. The cover separates the overhead inking rollers and inking area from the card location. This cover further provides a stripping means to keep money orders from lifting with the inked stamps upon withdrawal of such stamps after the money order card is stamped.

Other objects and advantages relating to the money order card stamping machine of this invention shall hereinafter appear in or become evident from the following detailed description having reference to the accompanying drawings forming a part of this specification.

In the drawings:

FIG. 3 is an end elevational view of the machine as seen from the operating handle end thereof and as viewed from the right in FIGS. 1 and 2, with the parts and mechanisms being lodged in inoperative relations;

FIG. 4 is an end view similar to FIG. 3, but with the operating parts occupying an intermediate position with the inking mechanism and inking rollers retracted from the stamp inking positions;

FIG. 8 is a vertical cross sectional view of the machine as viewed substantially along the plane of the line 8—8 in FIG. 2 to better illustrate certain coacting operating mechanisms of the machine;

FIG. 9 is a front edge elevational view partly in section of the date and place stamp operating bracket devised to link and actuate the independent money stamp means;

FIG. 10 is a plan view of the same bracket;

FIG. 11 is a fragmentary bottom plan view of the hub portion of the money stamp indexing wheel to illustrate part of the detent means employed;

FIG. 12 is a vertical cross sectional view of the money limit stamp indexing mechanism substantially as viewed along the plane of the line 12—12 in FIG. 1;

FIG. 13 is a diagrammatic face view of a money order card illustrating the imprintings of the independent stamp arrangements of the machine of the present invention;

Figure 1:
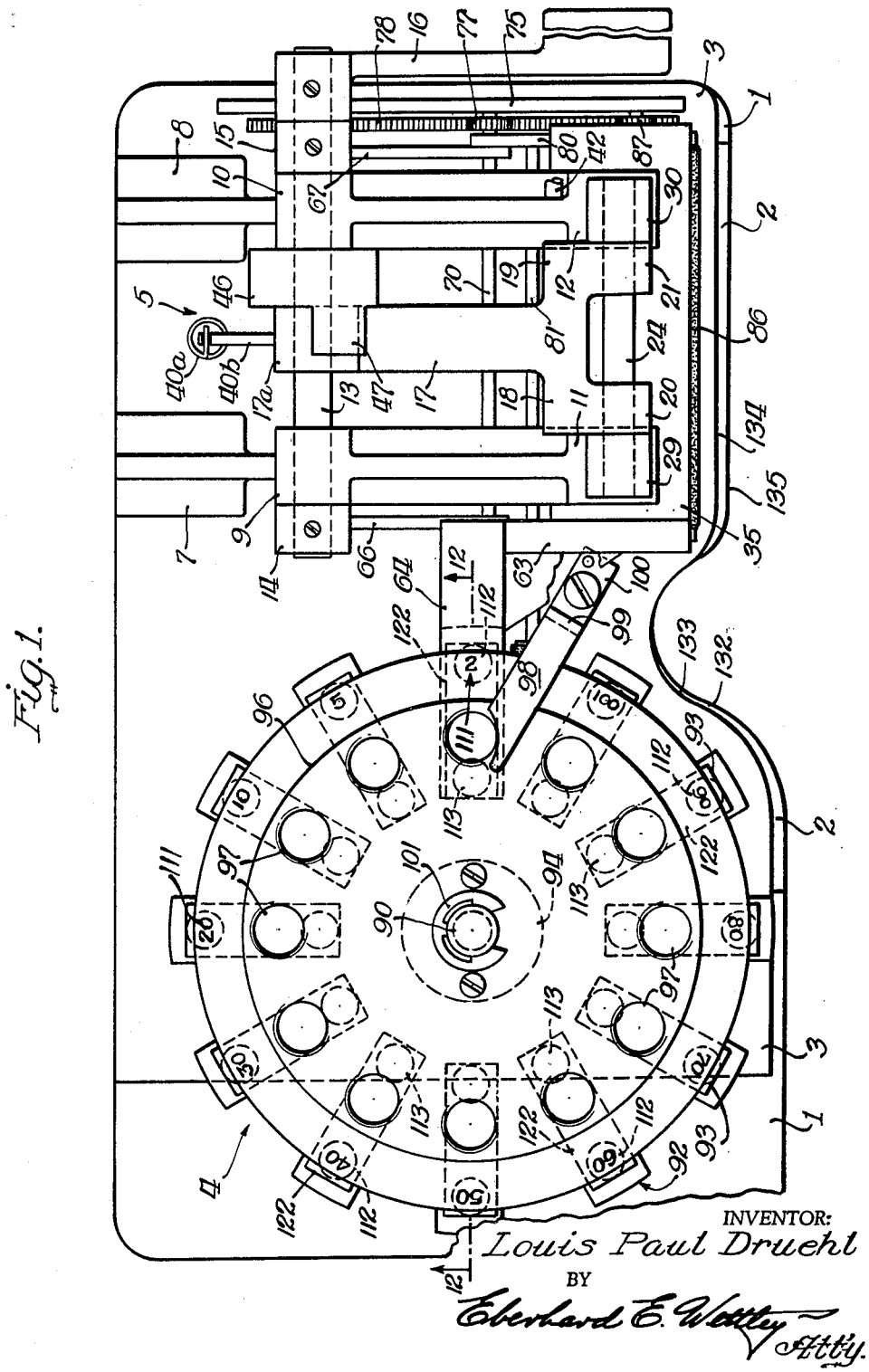
FIG. 1 is a general plan view of a machine embodying the concept of the present invention and of the mechanisms devised to carry out the functions of the present inventive concept.
Figure 2:
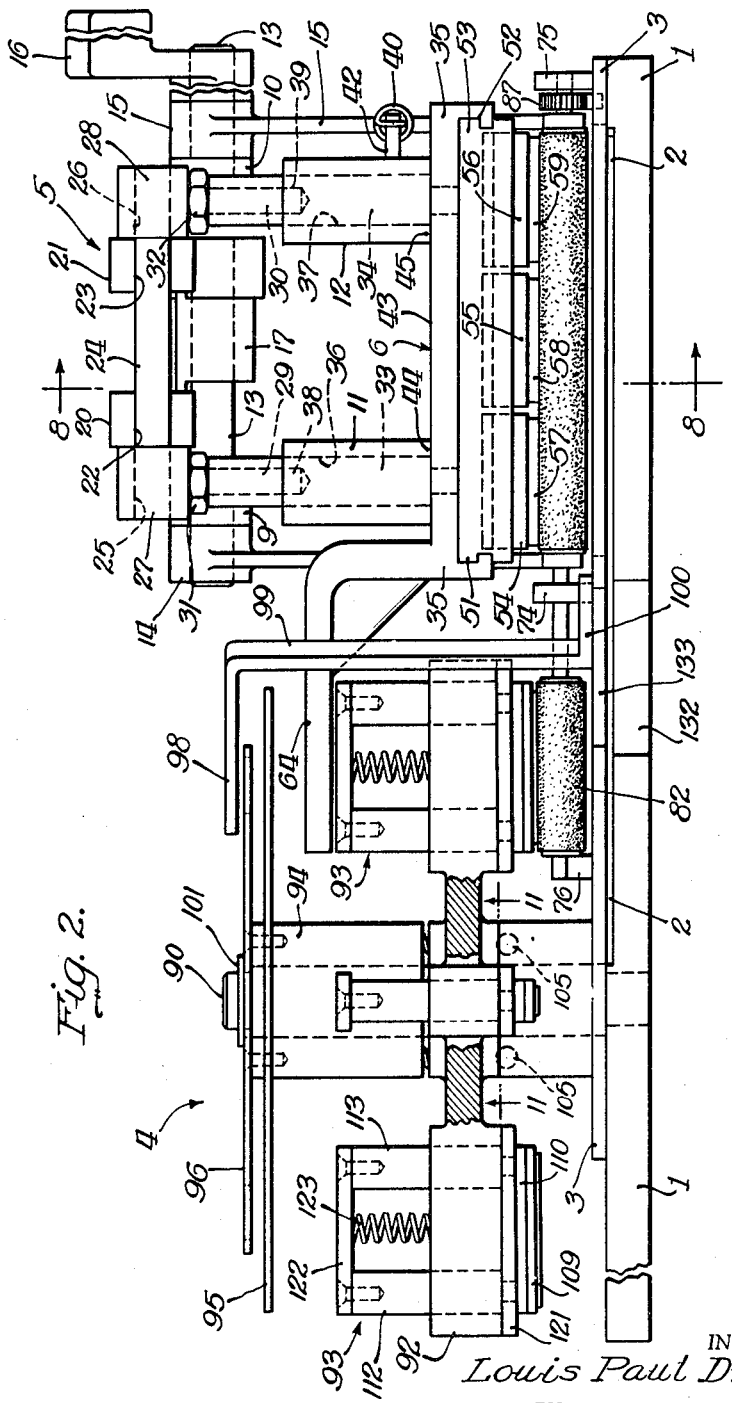
FIG. 2 is a front elevational view of the machine as seen from the operative and money order card feed side thereof.

The machine, in general, comprises a base 1 with a money order card orientation slot or recess 2, a cover 3 for the base, with a dollar limit money stamp holding dial wheel mechanism 4 to the left in FIGS. 1 and 2 and with the entire actuating mechanism 5 located on the base 1 laterally to the right hand side of the machine to actuate the triple date and place stamps 6 of the machine.

The actuating mechanism 5 comprises a pair of support standards 7 and 8 mounted on the cover-base combination resting on the cover 3 in longitudinal spaced relation to the base 1, such standards supplying a pair of elevated horizontally arranged bearing bosses 9 and 10 and also another pair of vertically arranged front bearing bosses 11 and 12. A shaft 13 is carried horizontally in aligned bores in bosses 9 and 10 and carries a pair of depending arms 14 and 15 secured to the shaft 13 and also a manually operable single actuating handle 16 which is keyed or otherwise secured to shaft 13.

A rocking bracket arm 17 is loosely journalled on shaft 13 and extends generally horizontally toward the front of the machine terminating in a forked end as at 18 and 19 having heads 20 and 21 with aligned forwardly open slots 22 and 23 in the ends thereof. The slots 22 and 23 of the heads 20 and 21 straddle a shaft 24 which is held in aligned bores 25 and 26 in a pair of blocks 27 and 28 carrying threaded studs 29 and 30 having adjusting nuts 31 and 32 threaded thereon.

A pair of guide pins 33 and 34 are secured to the date and place stamp linking bracket 35 and these pins are vertically guided and operable in bores 36 and 37 in bosses 11 and 12 of the support standards 7 and 8. Block studs 29 and 30 are screwed into threaded bores 38 and 39 in the guide pins 33 and 34 and locked tightly against loosening or turning by means of the adjusting nuts 31 and 32. With this arrangement vertical adjustment is possible to vary the downward motion of pins 33 and 34 through member 17 on shaft 13.

Figure 5:
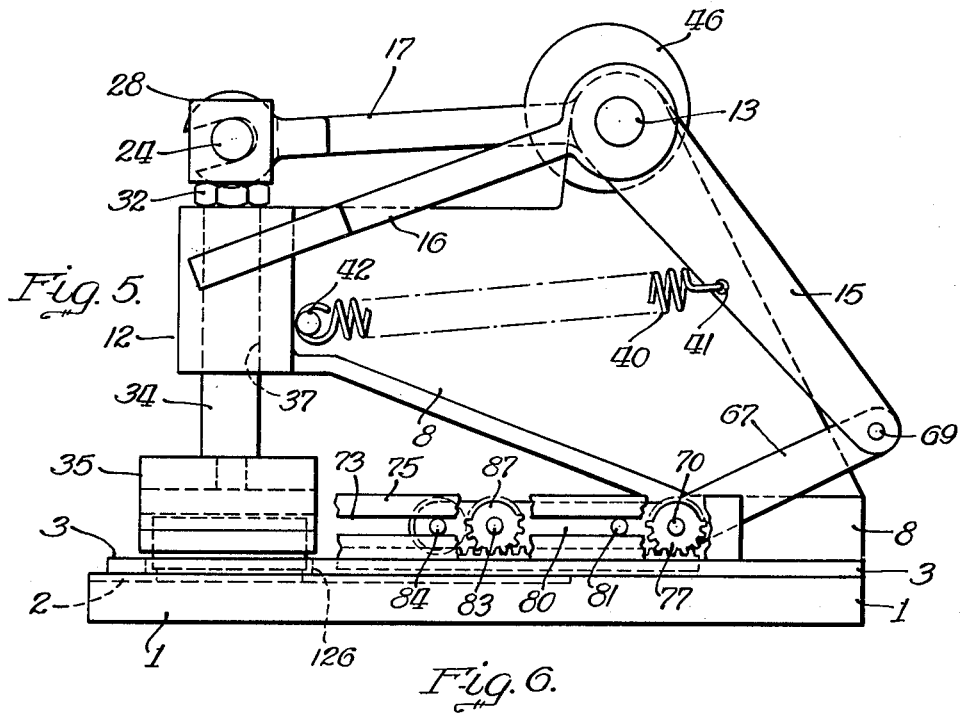
FIG. 5 is another similar end view as FIGS. 3 and 4 illustrating the printing positions of the stamp units of the machine.

Resilient means are employed to normally urge shaft 13 in a clockwise relation as viewed in FIGS. 3, 4, and 5 so as to keep arms 14 and 15 in a position to maintain the inking carriage and inking rollers of this carriage assembly in forward inking position as best illustrated in FIG. 8. In the machine illustrated, a tension spring 40 is looped through an opening 41 in arm 15 and the other end of the spring 40 is looped over a pin 42 secured to standard 8. With the use of another lighter spring 40a between pin 40b on arm 17 and a fixed support 40 on the base 1, the top surface 43 of the linking bracket 35, best shown in FIG. 1, is normally maintained in contact with the under surfaces or faces 44 and 45 of the bosses 11 and 12, to provide continued vertical orientation of the linking bracket for reasons that will be further hereinafter expressed. The spring 40a described functions to hold the linking bracket up as noted and this action will keep shaft 24 elevated with the arm 17 unit up and in the position shown in FIG. 8. Blocks 27–28, pins 33–34 and the bracket connected pins 33–34 will be urged upwardly also to provide the members instrumental in holding the linking bracket 35 against the bottoms 44 and 45 of bosses 11 and 12.

A cylindrical coupling or lost motion element 46 is secured to shaft 13 in eccentric relation to dispose a greater and heavier section thereof radially beyond the hub member 17a of the rocking bracket arm 17 as well shown in FIG. 8. A segmental lug 47 protrudes from the near face of the lost motion element 46 as seen in FIG. 8 and extends over and above the single arm end of the rocking bracket 17 at shaft 13. Bracket 17 is loose on shaft 13.

It should be noted in FIG. 8 that lug 47 provides an actuation reference surface in the more or less radially disposed side 48 of the lug which is spaced angularly away from the top side or surface 49 of the bracket arm 17 as indicated by the arrow 50. Since the rocking bracket arm 17 is loosely journalled on shaft 13, depression of handle 16 will move shaft 13 clockwise in FIG. 8 to initially swing arms 14 and 15 rearwardly toward the broken lined positions indicated and against spring 40 tension until face 48 of lug 47 contacts surface 49 on arm 17. Continued depression of handle 16 will then cause downward swinging of arm 17 to actuate the connected pins 33 and 34 to move them down thus depressing the linking bracket 35 and its date and place stamp structure 6.

The linking bracket 35 as seen in FIGS. 2, 9 and 10 is made with a guideway having ways 51 and 52 to receive a stamp holder 53 fitted at its ends to ride in ways 51 and 52. This holder carries three stamp units 54, 55 and 56 all made to hold interchangeable date and place stamps 57, 58 and 59 exposed downwardly to engage a money order card 60a to imprint the three date and location indicia marks 60, 61 and 62 as generally indicated in FIG. 13 and in the locations there shown.

It should be observed that the linking bracket 35 provides a lateral and elevated extension 63 terminating with a pressure bar 64 that is made to occupy a position for linking and operating anyone of the various money stamp limiting stamps individually when selected and positioned for simultaneous operative depression with the handle actuation of the date and place stamps with the mechanism hereinbefore described.

Figure 14:
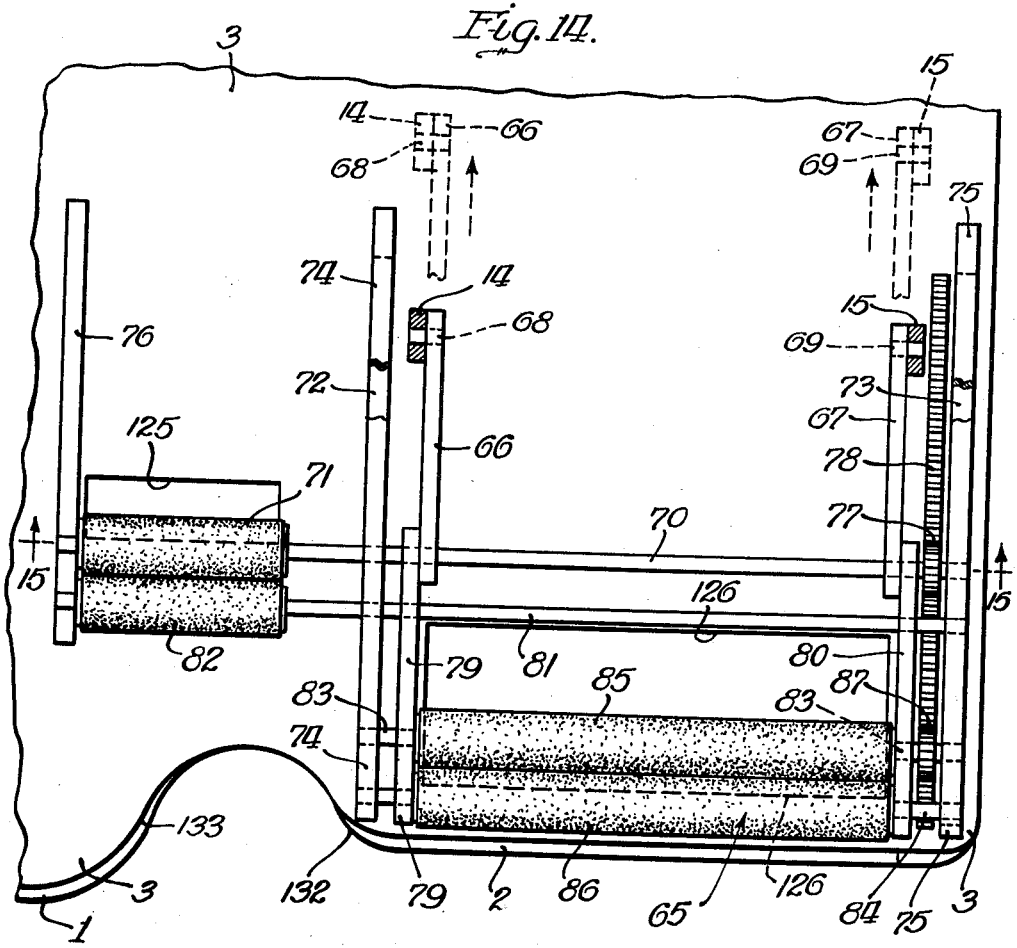
FIG. 14 is a plan sectional view of the machine taken substantially in the plane of the line 14—14 in FIG. 3 to better illustrate the inking mechanism provided in this machine.
Figure 15:
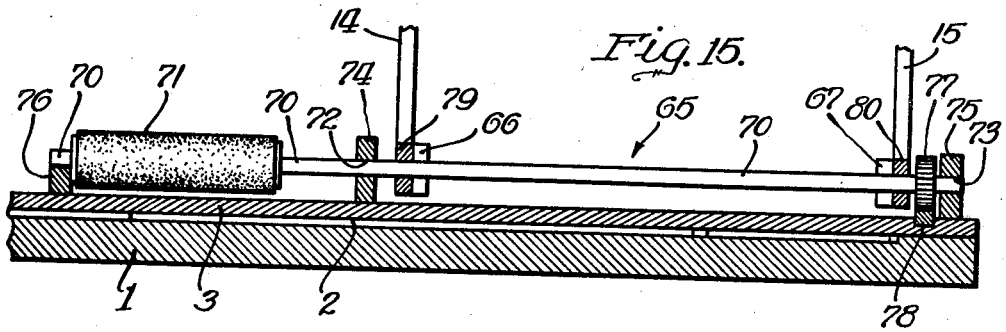
FIG. 15 is another detail cross sectional view of the inking mechanism as seen substantially in the plane of the line 15—15 in FIG. 14.

The inking mechanism 65 herein employed is best shown in FIGS. 14 and 15 and comprises a translatory movable carriage assembly that is controlled and operated by the swinging arms 14 and 15. Arms 14 and 15 pivotally connect with links 66 and 67 through pins 68 and 69 and the other ends of these links rotatably carry a cross shaft 70 having a hair or felt inking roller 71 mounted in outboard relation to ink the money stamp dial units of the machine. Shaft 70 is guided in slots 72 and 73 in guide bars 74 and 75 at the date stamp section of the machine, while the left hand end of the shaft rolls upon and rests on a rail 76 for guided support. A pinion 77 is secured to this shaft 70 at the right which rolls in mesh along the teeth of a fixed rack 78 to make the shaft 70 revolve as the roller 71 moves fore and aft of the machine as actuated through the arms 14 and 15.

Another pair of links 79 and 80 are connected to pivot on shaft 70 and these links carry a companion shaft 81 similar to shaft 70 that also rides in slots 72 and 73. Shaft 81 is journalled in links 79 and 80, and supports another hair or felt inking roller 82 that is disposed in surface contact with the roller 71. Rotation of roller 71 through the pinion 77 on rack 78 will cause roller 82 to turn thus spreading the inks on the two rollers and keeping the roller surfaces well inked to adequately service the stamps.

A second set of shafts 83 and 84 are journalled in links 79 and 80 in forwardly offset relation with respect to shafts 70 and 81 and carry longer hair or felt inking rollers 85 and 86 that serve one another through rolling contact as do rollers 71 and 82. Rollers 85 and 86 service the date and place stamps to keep such stamps freshly and continuously inked. A pinion 87 is secured to shaft 83 and rolls in mesh along the teeth of the fixed rack 78 whereby the roller 85 is turned by the swinging motion of arms 14 and 15 with roller 85 also turning roller 86 by contact therewith.

Referring now more particularly to FIGS. 1, 2 and 12, the dial wheel means 4 with its money selector dial is correlated and arranged for actuation by the common actuating mechanism 5 described. Means 4 are disposed in a lateral location to mechanism 5 on base 1 and cover 2 where any selected one of the money stamps of the wheel means are simultaneously serviced by the common inking mechanism 65 that also services the date and place stamps.

The base 1 rigidly supports an upright post 90 for the entire multiple money stamp dialing unit and a base hub 91 fixed to cover 2 is on the post and supports the wheel 92 that radially carries a plurality of money stamp assemblies 93 for rotative registry about the post and in a path leading between the bar 64 of the linking bracket 35 and across the inking rollers 71 and 82. A sleeve 94 is on post 90 and carries an indicia disc 95 beneath the selector dial 96 which is provided with dial openings 97 for finger tip manipulation up to and in finger stopping relation against a registering stop 98 overlying the dial and forming an extension of the upright arm 99 on a base mounted bracket 100. A lock washer 101 retains and orients the dial, indicia disc and sleeve 94 vertically on the post 90. A plurality of springs 102 seated and contained in aligned sockets 103 in sleeve 94 and 104 in the money stamp wheel 92 normally hold the dial assembly up against lock washer 101 and the money stamp wheel downwardly upon the base hub 91. A number of drive pins 102a are secured in the hub of wheel 92 and slidably fit into sockets 102b in sleeve 94 thus connecting the wheel and sleeve for simultaneous rotation by the selector dial 96.

Attention is also directed in the registering or detent mechanism comprising the ball elements 105 in upwardly open sockets 106 in the top of the base hub 91. The ball elements 105 protrude slightly above the top base hub surface and the adjacent hub portion 107 of wheel 92 has registering concavities 108 best shown in FIG. 11 which accept the protruding portions of the ball elements. Thus with a fixed base hub 91 and the ball arrangement described, the ball elements will align the individual money stamp elements into their respective radial printing positions as determined by the dial selection of the operator. The hub portion 107 and the wheel 92 are easily turned over the balls because of the permissible upward motion of the wheel against springs 102 previously described.

The money stamp assemblies 93 are all alike except for the money stamps 109 themselves since they are of different denominations that are held in their respective holders 110 in printing positions. The various denominations of stamps 109 are indicated on the indicia disc 95 to readily simplify the dialing operation in selecting the proper stamp for the particular money order being processed. One imprint of a stamp 109 is shown at 111 in FIG. 13 to limit the top value of the money order which is "TWO" in this particular example.

Each of the assemblies 93 comprises a pair of guide posts 112 and 113 slidably held in openings 114 and 115 in a segmental wheel wing 116 of the money stamp holding wheel 92. Each post 113 and 114 has a threaded stud as at 117 and 118 threaded into openings 119 and 120 in a tie bar 121 which bar carries the holder 110 for the support of one of the money stamps 109. A second tie bar 122 connects the tops of posts 112 and 113 and a spring 123 is seated in the socket 124 in wheel wing 116 to normally abut the undersurface of the tie bar 122 to hold the money stamp assembly in the normally raised full line position shown in FIGS. 2 and 12 and in operative vertically spaced clearance relation with respect to the operating bar 64 of the linking bracket 35 of mechanism 5. Limited downward movement causes the pressure bar 64 of the date and place stamp assembly 6 to abuttingly engage the tie bar 22 to then also move the money stamp downward as diagrammatically indicated at the left in FIG. 12, this particular action only actually taking place in the right hand side of FIG. 12 at the pressure bar 64 location.

Figure 6:
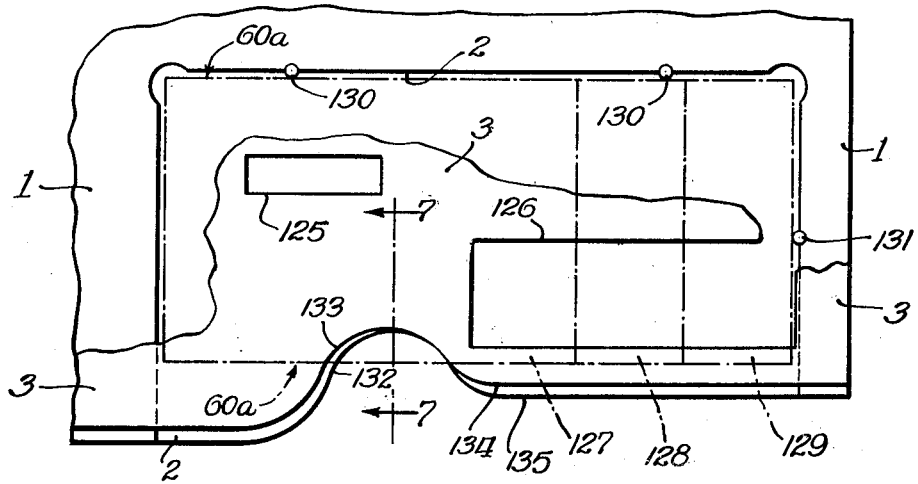
FIG. 6 is a detailed plan view of a fragmentary portion of the base of the machine to illustrate the money order card orientation arrangement.

When the stamps of the machine are lowered, they pass through the cover plate 3 through openings such as 125 for the money stamp and 126 for the multiple date and place stamps as best shown in FIG. 6. As shown in FIG. 13, the money order card 60a is made with the money order section 127 flanked by two stub receipt sections 128 and 129 and this entire card is guided into recess 2 in FIG. 6 for orientation by alignment pins 130 and 131. Suitable relief cut-outs such as 132 and 133 aid the placement or insertion of and removal of a card from printing and stamping position.

To stamp a money order card, the card is easily slipped into the recess 2 into the position shown in FIG. 6, the money stamp denomination is dialed with dial disc 96, and handle 16 is then depressed. Depression of handle 16 retracts the two sets of inking rollers to ink the selected denomination stamp and the date and place stamps and also advances all the latter active stamps downwardly into contact with the surface of the money order. Release of handle 16 will cause raising of the stamp back into their inoperative positions.

Figure 7:
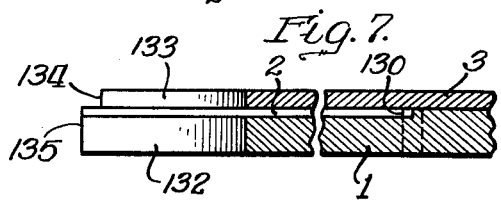
FIG. 7 is a fragmentary vertical cross sectional view of the base as it appears along the line 7—7 in FIG. 6.

If through the use of certain inks or for any other reason the card should adhere to the stamps, the cover 3 will strip the card and keep it in recess 2 for removal. It is also the cover 3 which separates the card orientation or holding area from the inking area and mechanism. By slipping the money order card into recess 2 under the cover 3 and its forward edge 134 offset rearwardly from the front base edge 135 (see FIGS. 6 and 7), the card will not touch any of the inking mechanism or parts nor the area close to such mechanism and surrounding the same. Withdrawal of the card is also cleanly and readily accomplished.

While the machine illustrated provides a single lever operation by hand, it is contemplated that electrical means may readily be employed to actuate the moving parts described. For example, a simple solenoid control may be provided to turn shaft 13 by means of a handle such as 16 without departing from the one stroke manipulation of the machine described.

The foregoing description has been directed to a preferred construction of machine to carry out the functions and purposes of this invention. This is by way of example only and changes and variations in the combinations described or in the individual parts thereof are contemplated without departure from the fundamental concept of the invention. The extent of such modifications shall, however, be governed by the breadth and scope of the language contained in the appended claimed subject matter directed to the concept of the money order stamping machine of this invention.

What I claim is:

1. A money order stamping machine comprising a base with money order orientation means thereon, an upstanding post on said base, a set of date and place stamps, a plurality of money denomination stamps, operable guide mechanism to raise and lower said date and place stamp in relation to said base, a rotary mechanism on said post including depressible means to carry said money stamps respectively and to dispose said individual stamps for depression in cooperative lateral alignment with said date and place stamps above said base, selective means connected with said rotary mechanism whereby to bodily transport any one of said money stamps into said aligned relation with respect to said date and place stamps, and actuation mechanism connected with said guide mechanism to move said date and place stamps downwardly relative to said base into money order printing positions including connected pressure bar means to simultaneously engage and to actuate the depressible means of aligned money stamp to move said money stamp downwardly into money order printing position in unison with said date and place stamps.

2. In the combination of claim 1 with the addition of a recess to provide the orientation means of said base within which to orient a money order card in a given relation with respect to the operative stamps, a cover on said base to cover said recess and to overlie said card, said cover having openings therethrough at said base recess location to permit the downwardly moving stamps to surface contact a recess confined money order card during the imprinting of such a card.

3. In the combination of claim 1 with the addition of an inking carriage assembly transportably mounted on said base to move across said base and having inking rollers to ink the operatively related money order printing stamps and wherein said actuation mechanism includes shiftable means connected with the carriage assembly to retract said inking carriage assembly and rollers out of inking relation with respect to said operative stamps prior to the stamping operation.

4. In the combination of claim 3 with the addition of a recess in the top surface of said base to receive and to orient a money order card in a given predetermined relation with respect to the operative stamps, a cover on said base disposed over the base recess and to overlie a money order card in a position intermediate the inking carriage assembly and the card location, said cover being provided with openings therethrough at said base recess location to permit said operatively actuable stamps to surface contact a recess confined money order card during the imprinting of such a card.

5. A money order stamping machine comprising a base, money order card orientation means on said base, date stamps aligned for concerted stamping operation, vertically operable mechanism to move said date stamps into printing contact with a card from a given raised position, a plurality of money denomination stamps, a wheel means to vertically movably support and to selectively orient any one of said money stamps in a given operative raised position above the card location, said wheel means including selection mechanism whereby to select any one of said money stamps and to orient the same into a given relation with respect to said date stamps, inking rollers carried on a carriage assembly to transport said rollers underneath said money denomination stamp and said date stamps to ink all of the aforesaid active stamps, and actuating mechanism connected to complete the money order card stamping operation comprising means to retract said inking carriage away from underneath the active stamping locations, lost motion means connected to operate mechanism to move said vertically operable mechanism down to move said date stamps down, and interconnecting means on said vertically operable mechanism to engage and to actuate a selected vertically movable money denomination stamp simultaneously with said date stamp into printing position upon the money order card.

6. In the combination of claim 5 with the addition of resilient means arranged to hold said actuating mechanism in an inoperative position with said lost motion means inactive and with said inking carriage in stamp engaging position, and further resilient means connected with said vertically operable mechanism to maintain the same and the connected date stamps in raised inoperative position free of said lost motion means.

7. In the combination of claim 5 wherein said wheel means comprises a turnable unit having segmental wings supporting vertically guided structures thereon arranged to support said individual money limit stamps, with resilient means disposed between said segmental wings and portions of said guided structures to dispose any one of said money stamps in coactive relation with respect to said inking rollers upon rotation of said wheel means, said resilient means also functioning to hold said guided structures in coactive relation with respect to said interconnecting means of the actuating means.

8. In the combination of claim 5 with the addition of a dial means connected to rotate said wheel means relatively to said date stamps, said dial means providing finger holes therein each corresponding to one of the carried money denomination stamps, a registry stop member to stop finger motion with the dial to orient a selected money stamp in a given relation with respect to said date stamps, and releasable detent means coacting with said wheel means to retain the same and the selected money stamp in its predetermined relation with respect to said date stamps and with respect to the inking rolls of the carriage assembly.

9. In the combination of claim 5 wherein said carriage assembly comprises at least two sets of inking rolls, one for the date stamps and one for the selected money stamps, said rolls being carried upon shafts mounted for guided and lateral motion transversely of said stamps in slotted rails, certain of said shafts having pinions secured thereto, a stationary toothed rack mounted on the machine base to receive said pinions in meshed engagement therewith, link members connecting said shafts, and swingable arms connected with said link members and comprising a part of said actuating mechanism whereby to move the rollers of the carriage assembly across the selected money stamp and the date stamps and into inoperative positions, motion of said carriage causing rotation of the inking roller shafts through said pinions and toothed rack.

10. A machine to perform the stamping operations that complete a money order or the like comprising, in combination, a base, a money stamp, date stamps separate from said money stamp, a first movable mechanism operably mounted on said base in one location thereon to independently support and to bodily align said money stamp with respect to said separate date stamps and adjacently oriented thereto, a second movable mechanism operably mounted on said base in another location thereon to independently support said date stamps in predetermined positions and for limited concerted bodily actuation independently of said money stamp, cooperative inking devices to simultaneously service all of said oriented stamps, orientation means to accept a money order card in a given relation with respect to all of the aforesaid oriented stamps for simultaneous printing contact by all of said stamps, and a handle actuated mechanism including means connected to actuate said inking devices across the stamps, means connected to actuate said date stamps toward said money order card and having a linking member connected therewith and arranged to abuttingly engage a portion of the money stamp support mechanism whereby to also actuate said money stamp toward said money order card together with said date stamps to carry out the inking and stamping functions of said machine through the operation of said handle.

11. In the combination of claim 10, wherein said money stamp and said separate date stamps as a group are each respectively supported by independently arranged guide means on their independent and respectively movable support mechanisms, and said money stamp guide means are connected with a dial member with orientation means carrying multiple individual money stamps thereon for the selective alignment of any one of a number of money stamps into a specific operative printing relation with respect to the group of date stamps.

12. In the combination of claim 11, with the addition of releasable detent apparatus coacting with said dial member to retain said individual money stamps in their selected printing relations with respect to a specific area on a money order for the money imprint and in a given relation with respect to the imprints of the date stamps on said money order.

13. A machine to perform a plurality of stamping operations on a money order or the like comprising, in combination, a money amount printing stamp, a number of date printing stamps, a base providing an edgewise accessible money order orientation recess therein to accommodate said stamps, a cover plate for said base overlying said base recess to provide a chamber for said money order, a first bodily movable means operatively mounted on said base at one location thereon to support said money amount printing stamp, a second bodily movable means operatively mounted on said base at another location thereon to support said date stamps for limited operation independently of said money amount printing stamp, actuating mechanism mounted on said base and having an arm connected with one of said movable means to actuate the same and its stamp or stamps toward and away from a money order lodged within said orientation recess, said actuating mechanism including a pressure bar to bodily engage the other of said movable means for the simultaneous actuation of all of the stamps to print the money order, said cover plate having openings therein to permit passage of the aforesaid stamps into the orientation recess chamber of said base for contact with said money order, said cover plate providing available stripping means for the money order upon retraction of said respective stamps from their depressed printing positions.

14. In the combination of claim 13, wherein said base recess is forwardly open in relation to the machine for edgewise money order reception and removal by an operator, both the cover and base having superimposed cutouts in the money order receiving edge portions thereof to provide finger grip clearance access for handling a money order when operating said machine, and wherein pin members are fixedly connected with the base for cover plate contact at spaced intervals about the base recess periphery to orient the money order in a given position within the confines of the base recess and spaced away from the peripheral walls of said recess ready for the stamping operation.

15. A machine to imprint a card or the like with a selected combination of stamps comprising a base, guide means on said base, first stamp means carried by said guide means for movement toward and away from said base, other stamp members, a rotary means mounted on said base and having support elements to individually carry said other stamp members for rotational displacement in a plane spaced above said base and in respect to the location of said first stamp members, said support elements including vertically depressible means connected to move said other stamp members individually toward said base, indexing mechanism to select and to position any one of said other stamp members in a given cooperative relation with respect to said first stamp members, stamp actuating mechanism on said base including lever elements to move said first stamp members toward and away from said base, and operative abutment means connected with said first stamp members for movement therewith and arranged to engage the selected one of said other stamp members to move the corresponding depressible means and said stamp member toward said base to carry out the printing function of the machine.

16. In a machine of the combination set forth and defined in claim 15, with the addition of an inking roller assembly transportably mounted on said base to service said first stamp members and the selected other stamp member by reciprocal movement across said base underneath said active stamp members, said actuating mechanism providing other lever means to move said inking roller assembly including a lost motion connection with said first lever elements whereby said inking roller assembly is initially made to ink said stamp elements and retracted from under said stamp elements before said lever elements effectively actuate the stamp members toward said base.

17. In the combination set forth in claim 16, with the addition of card orientation means on said base to align a card under the active stamp members, a protective cover for said card between the base and said inking roller assembly, said cover being apertured to allow the stamp members to engage and imprint an oriented card.

References Cited by the Examiner
UNITED STATES PATENTS

| | | | |
|---|---|---|---|
| 412,378 | 10/89 | Felt | 101—90 |
| 583,878 | 6/97 | Hocke | 101—90 |
| 1,291,026 | 1/19 | Koehler | 101—93 |
| 1,361,536 | 12/20 | Niemeyer | 101—103 |
| 1,689,633 | 10/28 | Lupien | 101—3 X |
| 2,896,533 | 7/59 | Boker et al. | 101—97 X |
| 3,056,347 | 10/62 | Dashew et al. | 101—269 |

ROBERT E. PULFREY, *Primary Examiner.*

WILLIAM B. PENN, *Examiner.*